Oct. 9, 1962  J. SNEED  3,057,630
SEAL
Filed Aug. 8, 1958
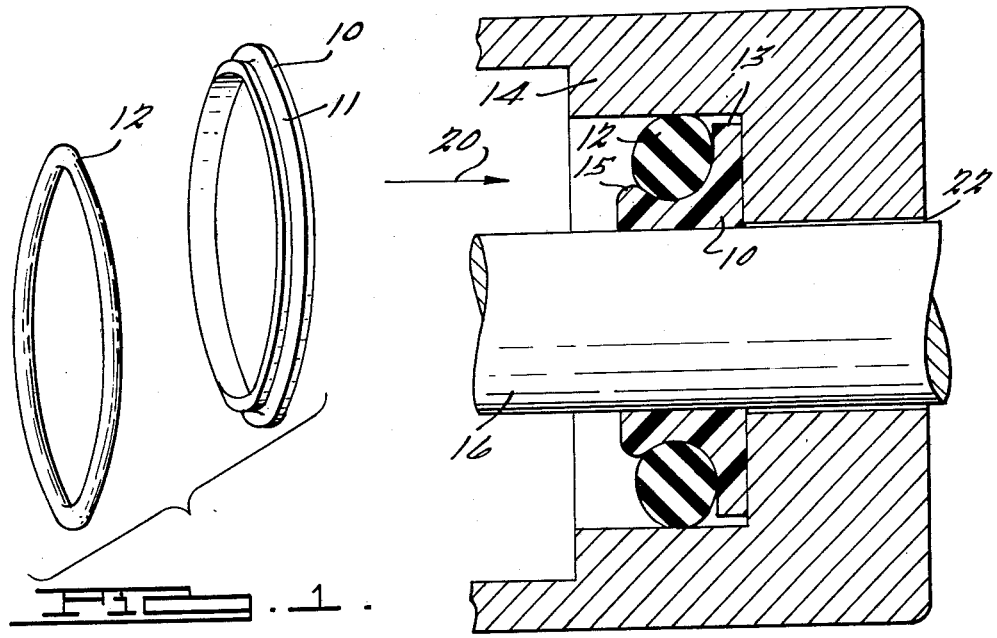
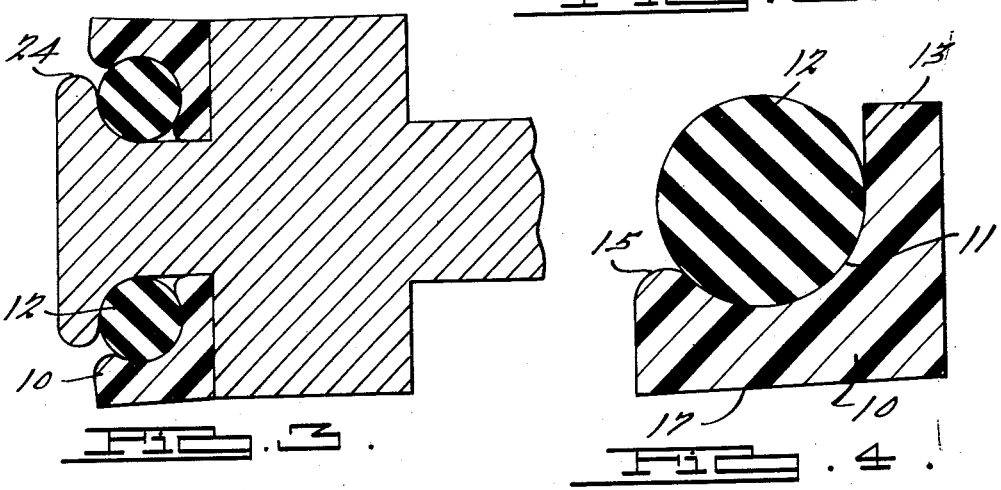
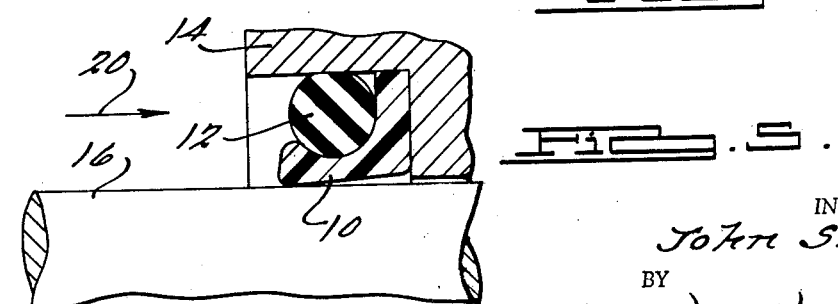
INVENTOR.
John Sneed
BY
M K Murphy
ATTORNEY United States Patent Office 3,057,630
Patented Oct. 9, 1962

3,057,630
SEAL
John Sneed, 18925 Prevost, Detroit 35, Mich.
Filed Aug. 8, 1958, Ser. No. 753,904
4 Claims. (Cl. 277—165)

This invention relates to an improved sealing means for use in any mechanism or apparatus where it is necessary or desirable to provide a seal against escape of fluid pressure around or between rotating or reciprocating parts.

Most seals now available for the purpose mentioned utilize in one way or another some type of "packing" in the form of rawhide, synthetic rubber or the like, which material, being flexible, must be maintained under pressure to do its job and is subject to wear, thus requiring frequent replacement. Such types of seals are unsuitable in places where two parts have high-speed rotation or reciprocation with respect to each other because of the high degree of wear on the flexible members.

I have provided an improved seal of simple construction that is economical to manufacture from materials readily available, and which will withstand high fluid pressures. My improved seal is further characterized by its extremely low friction characteristic and its extremely slow wear.

Accordingly it is the principal object of my invention to provide an improved seal having the above mentioned characteristics.

Another object is to provide a seal having an extremely low friction drag and being deformable under pressure to thereby increase the sealing effect.

Other advantages of the invention will become apparent from the following description which, taken in conjunction with the accompanying drawings, discloses a preferred embodiment.

In the drawings,

FIG. 1 is an exploded perspective view of a typical seal assembly drawn full size;

FIG. 2 is a sectional view of a shaft and housing assembly showing a typical use of the seal between relatively rotating parts;

FIG. 3 is a sectional view of a piston assembly showing another typical use of the seal;

FIG. 4 is a sectional view, on an enlarged scale, of the seal shown in FIGS. 1, 2 and 5; and FIG. 5 is a view similar to FIG. 2, but showing a different condition of operation.

Referring now to the drawings, it may be seen that my improved seal consists of two parts, a relatively rigid annulus 10 and a flexible O-ring 12. By the term "rigid," I mean that the annulus is rigid in a relative sense only, some flexibility of the same being essential to the operation of the device, as will presently appear. The annulus 10 is preferably triangular in section and has a groove 11 formed in the hypotenuse side thereof. The groove 11 is of such size that it snugly receives the O-ring 12 which may be stretched slightly to seat in the groove.

The O-ring may be of any suitable material that is resistive to the fluids to be used and is sufficiently deformable such that it may be stretched over the lip 15 of the annulus to seat in the groove 11, and be compressed in use to provide a tight seal.

The inside diameter of the seal is, of course, the inside diameter of the annulus 10. The outer diameter of the seal is determined by the degree of compression of the O-ring 12, but is in most instances only a few thousandths greater than the outer diameter of the annulus 10.

The annulus 10 is preferably made of "Teflon," "nylon," or other low-friction plastic. These substances are obtainable commercially under the trade-names mentioned and have varying formulas in accordance with the intended use.

The O-ring 12 is preferably formed of synthetic flexible material, such as "neoprene" or the like, which material is commercially obtainable in various formulations.

As may be seen from FIG. 4, which is an enlarged section of the seal assembly in its free state, the cylindrical surface 17 of the annulus 10 is tapered such that the rear portion thereof snugly engages the shaft 16 whereas the forward portion has some clearance with respect to the shaft. When the seal is assembled to the parts 14 and 16, the circumferential area of the radially extending portion 13 of the annulus is usually disposed in engagement with the inner cylindrical surface of the journal housing 14 as shown in FIG. 5. Normally, the O-ring 12 is slightly compressed in the radial direction.

Pressure of the fluid in the direction of the arrow 20 (FIGS. 2 and 5) will cause some deformation of the O-ring in the axial direction, as shown in FIG. 2, and the tendency is for the leading portion of the annulus to move radially inwardly into engagement with the shaft as shown in FIG. 2. The groove 11 has a lip 15 which tends to retain the O-ring on the annulus as shown. The radial portion 13 of the annulus has no lip, the smooth inner surface thereof providing space for deformation of the O-ring as shown in FIG. 2.

The relatively high strength and rigidity of the annulus 10 will maintain sealing relationship between the parts under conditions when the pressure exerted by the fluid in the direction of the arrow 20 is excessive. This condition is one where my seal demonstrates great superiority over seals of all flexible material. The latter, under conditions of abnormal pressure, tend to expand into the space 22 between the shaft and housing and lose their sealing function.

It will be noted that my improved seal provides excellent sealing under all pressure conditions with extremely low drag on the rotating parts. With low, fluid pressures (FIG. 5), the sealing is effected at the flattened outer radial surface of the O-ring and at the rear edge portion of the annulus which tightly engages the shaft. As the fluid pressure increases (FIG. 2 shows the extreme condition), the axial portion of the annulus flattens somewhat such that more and more of the axial bore thereof engages the shaft and the O-ring tends to assume an elliptical shape while engaging the inner bore of the journal housing with increased pressure.

FIG. 3 shows a typical installation of the seal on the end of a reciprocating piston member 18. It will be understood that the piston is intended to be reciprocated within some kind of housing or cylinder (not illustrated) under influence of or to generate fluid pressure. In this instance, the parts of the seal are recessed, the O-ring being seated in an internal groove in the annulus rather than an external groove, and the annulus is provided with both an axial lip and a radial lip although one or both of the lips may be omitted if desired. In this example, an annular lip 24 formed on the piston retains the seal in place. The lip 24 is formed such that it will retain the seal against displacement, yet still permit the placement of the seal. The seal is positioned on the piston by dropping one side into the groove, then forcing the other side over the lip 24. In some instances, the annulus 10 may be inserted first and the O-ring placed afterward.

As in the example just described, it will be seen that, once correctly placed, the O-ring will exert radial pressure on the annulus when the parts are assembled, thereby maintaining sealing relationship at all times. The plastic annulus, while relatively rigid as compared with the O-ring, is designed to have some flexibility such that the pressure exerted by the O-ring under influence of fluid pressure axially of the piston can expand or contract the diameter of the annulus to provide sealing effect.

My improved seal is, of course, useful in places where there is no rotation or reciprocation between the parts, and while the annulus 10 has been shown as a plastic member, it may be made of metal or of sintered, oil-impregnated material.

While I have illustrated and described only two of the several forms my invention may assume and have mentioned only a few of the materials from which the seal members may be fabricated, it will be understood that such has been done by way of example and not by way of limitation.

This application is a continuation-in-part of my co-pending application Serial No. 433,004, filed May 28, 1954.

I claim:

1. An improved sealing device for sealing the annular clearance between a pair of relatively movable machine parts, comprising, an annulus of low friction, relatively rigid plastic material having an axially extending portion with a sliding sealing surface and having a portion extending radially therefrom, a groove in the angle between said portions, and a yieldable O-ring seated in said groove, the diameter of said parts differing slightly such that upon assembly the O-ring is under compression between one of the machine parts and the surface of said groove and the sealing surface of the annulus is in sealing engagement with the other machine part; the sealing surface of said annulus being tapered such that under conditions of low fluid pressure on said device only a portion of said sealing surface engages the adjacent machine part and increasing fluid pressure causes deformation of said O-ring and corresponding increasing pressure on said annulus which tends to force an increasing amount of said sealing surface into sealing engagement with said adjacent machine part.

2. An improved sealing device for sealing the annular clearance between a pair of relatively movable machine parts, comprising, an annulus of low friction, relatively rigid plastic material having an axially extending portion with a sliding sealing surface and having a portion extending radially therefrom, a groove in the angle between said portions, and a yieldable O-ring seated in said groove, the diameter of said parts differing slightly such that upon assembly the O-ring is under compression between one of the machine parts and the surface of said groove and the sealing surface of the annulus is in sealing engagement with the other machine part; the sealing surface of said annulus being tapered such that under conditions of low fluid pressure on said device only a portion of said sealing surface engages the adjacent machine part and increasing fluid pressure causes deformation of said O-ring and corresponding increasing pressure on said annulus which tends to force an increasing amount of said sealing surface into sealing engagement with said adjacent machine part, the said axially extending portion of said annulus having a lip along the edge of said groove for retaining said O-ring in place.

3. An improved sealing device for sealing the annular clearance between a pair of relatively movable machine parts, comprising, an annulus of low friction, relatively rigid plastic material having an axially extending portion with a sliding sealing surface and having a portion extending radially therefrom, a groove in the angle between said portions, and a yieldable O-ring seated in said groove, the diameter of said parts differing slightly such that upon assembly the O-ring is under compression between one of the machine parts and the surface of said groove and the sealing surface of the annulus is in sealing engagement with the other machine part; the sealing surface of said annulus being tapered such that under conditions of low fluid pressure on said device only a portion of said sealing surface engages the adjacent machine part and increasing fluid pressure causes deformation of said O-ring and corresponding increasing pressure on said annulus which tends to force an increasing amount of said sealing surface into sealing engagement with said adjacent machine part, the said axially extending portion of said annulus having a lip along the edge of said groove for retaining said O-ring in place and the radially extending portion of said annulus having a straight side tangent to the curve of said groove.

4. A non-metallic two-piece seal for sealing an annular clearance space between a pair of relatively movable elements comprising a rubber-like O-ring and a relatively rigid angularly shaped annulus of low friction material having an axially extending portion with a frustro-conical sealing surface progressively engageable in coaction with said O-ring with an adjacent one of said movable elements from the lesser to the greater diameter of said sealing surface and having an integrally formed portion extending radially from said axially extending portion near the larger end of said frustro-conical surface, said O-ring having initially stressed engagement with the said axially extending portion of said annulus opposite a portion of said frustro-conical surface and engaging, and having a greater radial dimension in its stressed condition than the radial height of, said radially extending portion, and said O-ring being also engageable with the other of said movable elements in stressed compression; the said frustro-conical sealing surface of said annulus being tapered such that under conditions of low fluid pressure on said seal only a portion of said sealing surface of lesser diameter engages the said adjacent movable element and increasing fluid pressure causes deformation of said O-ring and increasing pressure on said annulus which tends to force an increasing amount of said sealing surface of otherwise greater diameter into sealing engagement with said element.

References Cited in the file of this patent

UNITED STATES PATENTS

| | | |
|---|---|---|
| 2,437,586 | Aber | Mar. 9, 1948 |
| 2,511,386 | Warren | June 13, 1950 |
| 2,760,794 | Hartranft | Aug. 28, 1956 |
| 2,772,900 | Campbell | Dec. 4, 1956 |
| 2,784,013 | Groen | Mar. 5, 1957 |
| 2,825,590 | Sutherland | Mar. 4, 1958 |
| 2,857,184 | Mancusi | Oct. 21, 1958 |

FOREIGN PATENTS

| | | |
|---|---|---|
| 224,101 | Great Britain | Nov. 6, 1924 |
| 141,256 | Australia | June 10, 1948 |